(12) United States Patent
Venkataraman (10) Patent No.: US 7,751,634 B2
(45) Date of Patent: Jul. 6, 2010

(54) COMPRESSION SYSTEM FOR INTEGRATED SENSOR DEVICES

(75) Inventor: Kartik Venkataraman, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 727 days.

(21) Appl. No.: 11/700,090

(22) Filed: Jan. 31, 2007

(65) Prior Publication Data

US 2007/0127831 A1  Jun. 7, 2007

Related U.S. Application Data

(62) Division of application No. 10/410,192, filed on Apr. 10, 2003, now Pat. No. 7,373,005.

(51) Int. Cl.
*G06K 9/46* (2006.01)
(52) U.S. Cl. .................. 382/239; 382/244; 382/245; 382/246
(58) Field of Classification Search .......... 382/232–253
See application file for complete search history.

(56) References Cited

U.S. PATENT DOCUMENTS

| | | | |
|---|---|---|---|
| 5,506,916 A * | 4/1996 | Nishihara et al. | 382/232 |
| 5,764,374 A | 6/1998 | Seroussi et al. | |
| 5,848,195 A | 12/1998 | Romriell | |
| 5,883,975 A * | 3/1999 | Narita et al. | 382/232 |
| 6,047,112 A | 4/2000 | Wise et al. | |
| 6,072,830 A | 6/2000 | Proctor et al. | |
| 6,396,422 B1 | 5/2002 | Barkan | |
| 6,580,828 B1 * | 6/2003 | Li | 382/233 |
| 7,092,965 B2 | 8/2006 | Easwar | |

OTHER PUBLICATIONS

Pajarola, Renato, Fast Huffman Code Processing, UCI-ICS Technical Report No. 99-43, Department of information & Computer Science, University of California, Irvine, Oct. 1999.
Adaptive Huffman Coding [online], retrieved from the Internet on Dec. 10, 2002, . <URL:http://datacompression.info/AdaptiveHugman.shtml>.
Lossless Data Compression, Consultative Committee for Space Data Systems, Report Concerning Space Data System Standards, CCSDS 120.0-G-1 Green Book, May 1997.

* cited by examiner

*Primary Examiner*—Wesley Tucker
(74) *Attorney, Agent, or Firm*—Dickstein Shapiro LLP (57) ABSTRACT

An imaging system incorporating adaptive compression which includes determining linear predictive differential residuals from an imager array pixel row. The differential residuals are classified into categories, each category having a range of differential residuals associated with it. The categories are analyzed to produce an ordered list having categories with most to least frequent residuals falling within a respective residual range associated with a respective category. The ordered list is then used to select a variable length encoding table with a matching ordered list. Variable length encoded category and range position offset data is output to a serializer unit, where the range position offset refers to a position in a range associated with a particular category.

20 Claims, 10 Drawing Sheets

| Category | Ranges | [Max Offset, Number of Bits] |
|---|---|---|
| 0 | 0 | - |
| 1 | -1,+1 | [1,1] |
| 2 | -3,-2, +2, +3 | [3,2] |
| 3 | -7, . . . ,-4, 4, . . . ,7 | [7,3] |
| 4 | -15, . . . ,-8, +8, . . . , +15 | [15,4] |
| 5 | -31, . . . ,-16, +16, . . . , +31 | [31,5] |
| 6 | - 63, . . . ,-32, +32, . . . , +63 | [63,6] |
| 7 | -127, . . . ,-64, +64, . . . , +127 | [127,7] |
| 8 | -255, . . . ,-128, +128, . . . , +255 | [255,8] |

FIG. 3

CATEGORY 4

| Differential Value | -15 | -14 | -13 | -12 | -11 | -10 | -9 | -8 | +8 | +9 | +10 | +11 | +12 | +13 | +14 | +15 |
|---|---|---|---|---|---|---|---|---|---|---|---|---|---|---|---|---|
| Position Offset | 0 | 1 | 2 | 3 | 4 | 5 | 6 | 7 | 8 | 9 | 10 | 11 | 12 | 13 | 14 | 15 |

| 56 | 54 | 47 | 40 | 34 | 31 | 27 | 26 |
|----|----|----|----|----|----|----|----|

FIG. 6

| Current Pixel Value Minus Previous Value | 56-0 | 54-56 | 47-54 | 40-47 | 34-40 | 31-34 | 27-31 | 26-27 |
|---|---|---|---|---|---|---|---|---|
| LPD Residual | +56 | -2 | -7 | -7 | -6 | -3 | -4 | -1 |

FIG. 7

| LPD Residual | +56 | -2 | -7 | -7 | -6 | -3 | -4 | -1 |
|---|---|---|---|---|---|---|---|---|
| Category Symbol | CAT 6 | CAT 2 | CAT 3 | CAT 3 | CAT 3 | CAT 2 | CAT 3 | CAT 1 |

FIG. 8

PDF Distribution

| Category Symbols Sorted by Frequency | Number of Residuals In Range Associated with Category |
|---|---|
| CAT 3 | 4 |
| CAT 2 | 2 |
| CAT 1 | 1 |
| CAT 6 | 1 |

FIG. 9

| Frequency Sorted Category Symbols | Binary Codename |
|---|---|
| CAT 3 | 0 |
| CAT 2 | 10 |
| CAT 1 | 110 |
| CAT 6 | 1110 |

FIG. 10

| Pixel Position In Row | Category Binary Value | Offset (sent as binary) |
|---|---|---|
| 1 | 1110 | 56 |
| 2 | 10 | 1 |
| 3 | 0 | 0 |
| 4 | 0 | 0 |
| 5 | 0 | 2 |
| 6 | 10 | 0 |
| 7 | 0 | 3 |
| 8 | 110 | 0 |

Columns 2 and 3 are grouped as "Transmitted Data".

FIG. 11

COMPRESSION SYSTEM FOR INTEGRATED SENSOR DEVICES

CROSS-REFERENCE TO RELATED APPLICATIONS

This application is a divisional of U.S. patent application Ser. No. 10/410,192, filed on Apr. 10, 2003, now U.S. Pat. No. 7,373,005 the subject matter of which is incorporated in its entirety by reference herein.

FIELD OF THE INVENTION

The present invention relates generally to improved semiconductor imaging devices, and in particular to a compression system for image data transfer.

BACKGROUND OF THE INVENTION

As imaging technology has evolved, the density of imaging data has increased. Larger amounts of imaging data reduces speed and performance of imaging devices. Accordingly, a variety of approaches have been developed to improve the speed of imaging systems.

Figure 1:
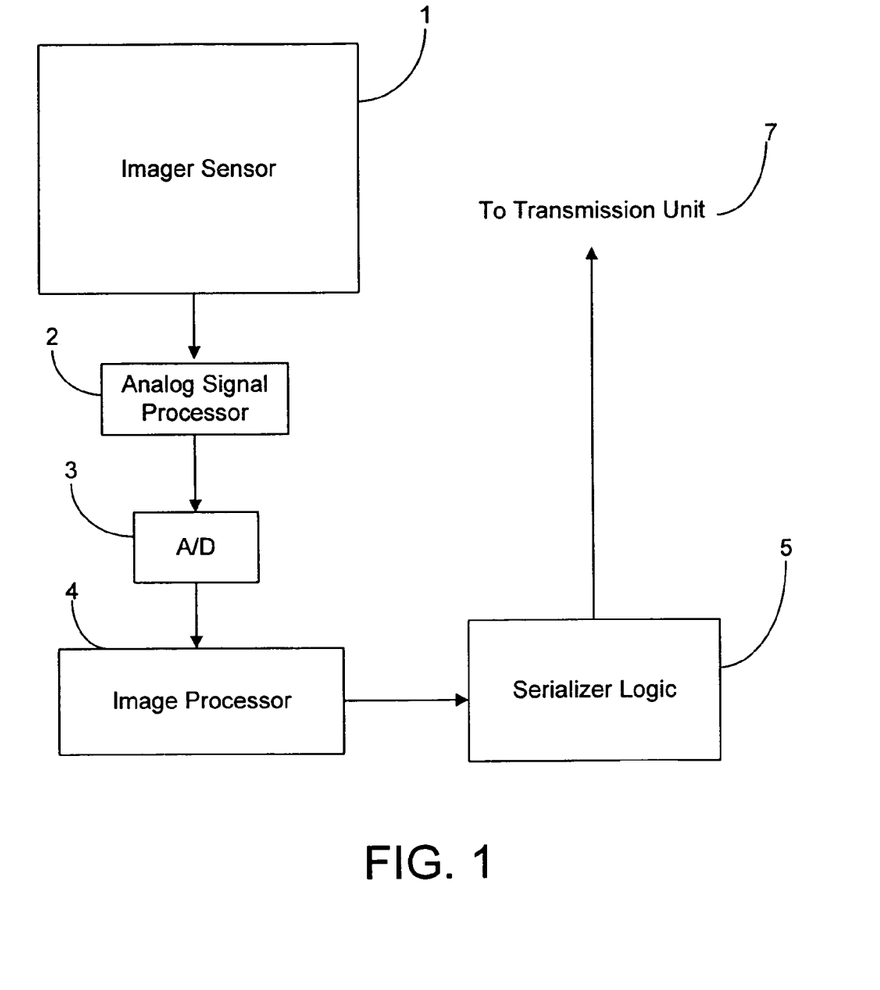
FIG. 1 shows a block diagram of a conventional CMOS imager device without compression logic.

FIG. 1 shows a block diagram of a conventional integrated sensor imager device fabricated on a chip. An imaging sensor 1 with an array of pixels transmits analog pixel signals to a sample and hold analog signal processing circuit 2. The analog output signals from circuit 2 are digitized in an analog to digital converter 3 and the digital signals are processed in an image processor 4. Imaging data is read out of the processor 4 and sent to a serializer 5. The serializer 5 sends imaging data to a transmission unit 7. In some sensors systems, such as the one illustrated in FIG. 1, acquired images show a great deal of correlation from one pixel value to the next. Images with correlation attributes typically exhibit a low entropy when individual differences from one sample to the next are considered for compression (and transmission) instead of the samples from the original image. Entropy is defined as the amount of information content uncertainty of some random variable X. Images that exhibit a high degree of random values are said to have a high entropy, while images where most pixels have the same value are said to exhibit a low entropy.

The performance of imaging systems can be improved by using compression techniques. Imaging data compression can be grouped into two categories: lossy and lossless compression. Lossless and lossy compression are terms that describe whether or not, in the compression of a file, all original data can be recovered when the file is uncompressed. With lossless compression, every single bit of data that was originally in the file remains after the file is uncompressed. That is, all of the information is completely restored during the decompression of the data. Lossless compression is generally the technique of choice for text or spreadsheet files, where losing words or financial data could pose a problem. The Graphics Interchange File (GIF) is an image format that provides lossless compression.

Lossy compression, on the other hand, reduces a file by permanently eliminating certain information, especially redundant information. When the file is uncompressed, only a part of the original information is still there (although the user may not notice it). Lossy compression is generally used for video and sound, where a certain amount of information loss will not be detected by most users. The JPEG image file, commonly used for photographs and other complex still images, uses lossy compression techniques. JPEG compression allows a creator to decide how much loss to introduce and make a trade-off between file size and image quality.

Real-time lossless compression of images acquired from an image sensor can be accomplished using custom logic integrated on the same chip as the imager sensor. It is possible to accomplish lossless compression with a minimal amount of dedicated hardware.

As density of image data to be transmitted or communicated increases, designers have tried to find ways to maximize lossless compression of the image while at the same time minimizing the amount of dedicated hardware required. Also, many applications require the use of lossless compression due to additional design constraints. For example, remote endoscopy units in medical imaging applications have both hardware area and available bandwidth constraints. Variations of color and texture in medical imaging applications are very small and it is important, from a diagnostic point of view, that subtle variations are captured and not lost. Also, regulatory issues (e.g., FDA approval) will almost certainly be more complex in the with the use of lossy data compression, therefore data loss is undesirable. Accordingly, size, area and other constraints adversely affect speed and efficiency of conventional imaging systems. An increase in available bandwidth and performance due to an improved lossless compression is needed.

BRIEF SUMMARY OF THE INVENTION

The invention provides a method and apparatus for improved compression of images exhibiting low pixel variations where images are characterized by a strong correlation between one pixel and its immediate neighbors.

One embodiment provides for the use of linear prediction differential residual calculations to reduce variation between numerical pixel signal values. Differential residuals are classified into categories, where each category describes an ordered range of differential residual values. Frequency of occurrence of each differential residual within a given range is determined and compiled into an ordered list of categories with most frequent residuals, next most frequent residuals and so on to the category with the least number of residuals. A variable length coding table that has the same list of ordered categories is selected from a set of stored variable length coding tables. Once a variable length coding table is selected, each residual is mapped into a variable length codeword associated with a category value along with an offset value. The offset value describes the position of the particular pixel signal value to be encoded within the ordered range associated with each category. Precise reconstruction of the initial pixel signal value can be achieved using a category identifier, a known range associated with a category and a range position offset value. Each mapped variable length codeword and associated range position offset value is sent to a serializer on the imager and then to a transmission unit.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION OF THE INVENTION

The invention uses adaptive lossless data compression to increase performance of imager sensors. Image data can be manipulated into symbols exhibiting low entropy or variation that can be compressed using adaptive lossless data compression to achieve compression ratios that are between a factor of two and three.

A variety of advantages are obtained by the use of efficient compression using adaptive lossless data techniques and minimized hardware design. For example, there is an increase in available bandwidth in a given transmission channel. Also, as more information can be represented in a fewer number of bits, the invention allows an increase in the overall throughput of transmitted data and a reduction of power consumption by constant throughput. The invention also has the ability to provide an error resilience capacity in the transmission system. In other words, the increased bandwidth can be used to build in error correction to account for channel transmission errors, thereby increasing data fidelity in the system.

Figure 2:
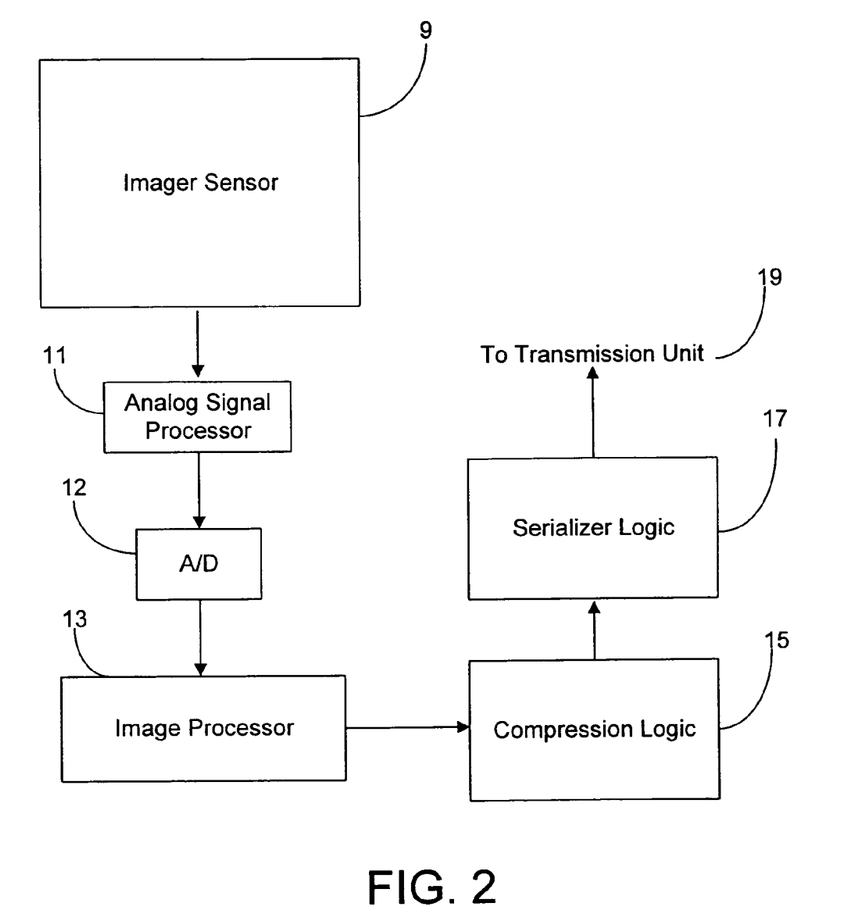
FIG. 2 shows an a block diagram of a CMOS imager sensor with compression logic constructed in accordance with an exemplary embodiment of the invention.

FIG. 2 shows an exemplary embodiment of an integrated sensor with built-in adaptive compression in accordance with one aspect of the invention. In FIG. 2, an image sensor 9 with a collection of pixels transmits imaging signals to an analog signal processor 11 which includes a sample and hold circuit. The analog signal processor 11 sends analog signals to an analog to digital converter (ADC) 12. The ADC 12 sends digital signals to an imager processor 13. The image processor 13 sends imaging data to compression logic unit 15, which performs adaptive compression of image data on a row-by-row basis in one exemplary embodiment. The compressed image data is sent to a serializer logic unit 17. The serializer logic unit 17 sends imaging data from the serializer to a transmission unit 19.

A combination of several techniques can be used to perform adaptive compression in embodiments of the invention. Linear predictive differential (LPD), residual classification, variable length encoding and range position offset encoding, for example, can be used with the invention to perform a variety of adaptive data compression functions.

LPD coding produces a corresponding set of differential residuals from pixel data sampled from a row in the pixel array. LPD coding uses differential information from a set of symbols, such as a grey code or other digitized pixel signal values, to produce residual values that exhibit low variances between the residual values. A previous symbol value and a subsequent symbol value are used to determine each successive differential value. In other words, a differential is obtained by determining how much must be added to the previous value to obtain the current value. One way a differential can be calculated is by subtracting a previous pixel value from a current pixel value. For example, pixel signal values are read from a given pixel row and then digitized. LPD coding is then used to produce an equivalent set of differential residual symbols. Thus, if (12, 14, 13, 18, 17, 19) are a set of six digital values, or symbols, sampled from six pixels in a row, LPD coding of the pixel signal symbols produces the following set of differential residual symbols, (+12, +2, −1, +5, −1, +2). In other words, the differential residual symbol describes the "difference" or variance of a particular symbol from the immediately preceding symbol.

In the above example, there is no preceding symbol before the value 12, as it is the first in the data set. Accordingly, we can use zero ("0") as the first preceding symbol. So, the differential residual symbol for 12 is (12−0) which is +12. The symbol 14 is two more than the preceding symbol 12, therefore the differential residual symbol of 14 is +2. The symbol 13 is one less than the preceding symbol 14, so its differential residual symbol is −1. The differential residual symbol for 18 is +5 and the differential residual symbol for 17 is −1, etc. This continues until the last symbol is converted to its differential residual symbol. In this example, the last symbol is 19, which translates to differential residual symbol +2 (i.e., 2 more than 17).

Further compression can be accomplished using residual classification. Residual classification reduces the possibility of undesirable data expansion in the encoded datastream by reducing the actual bit size of the largest or maximum bit size of a codeword used to describe pixel data. By defining categories whose elements span a range of differential residual symbol values and replacing the symbols with category identifiers which will then be variable length (VL) entropy coded, the entropy of the pixel datastream is further lowered. Additionally, since a category identifier now takes the place of the binary pixel value (category identifiers, e.g., 1, 2, 3, 4, vs. differential residual symbols), there are now a smaller number of symbols to be encoded. The bit size of the maximum variable length of transmitted codenames (in terms of bits needed) is accordingly reduced.

Range position offset values are used to uniquely identify a residual in conjunction with the range based category identifier. As previously explained, residuals are converted to category identifiers based on ranges of residual values during encoding to reduce the total number of data symbols for encoding and subsequent transmission. Category identifiers, which indicate which range of residuals an individual residual falls within, must be mapped back to individual residual values when received by a system receiving transmitted compressed image data. Accordingly, additional data beyond range information a particular residual fell within is needed to determine what the original residual value was before conversion to a category identifier. The range position identifier provides the additional data for reverse mapping of category identifiers back to individual residual values. The use of a range position offset value with a category identifier is further explained with reference to FIGS. 3 and 3A below.

Figure 3:
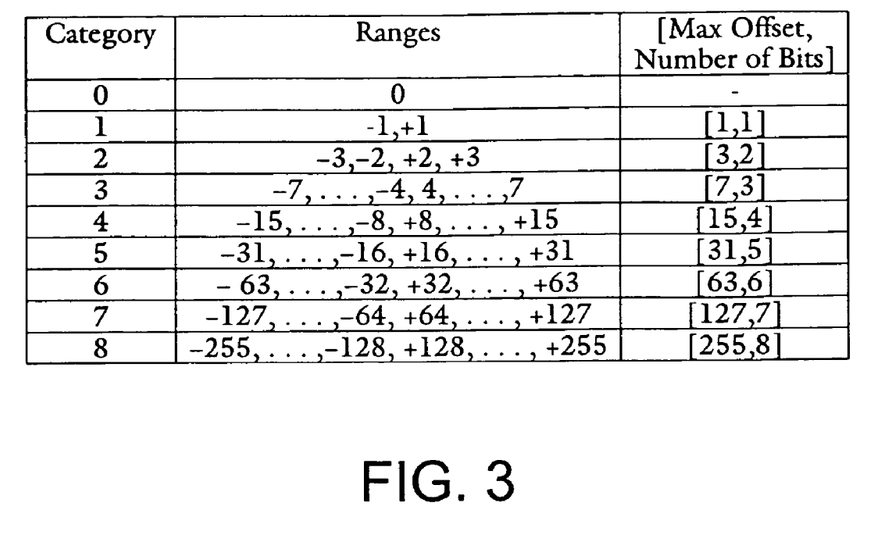
FIG. 3 shows a table showing categories and offset values as used with an exemplary embodiment of the invention.

Category identifiers represent a range of residual values. Each category identifier's range boundaries can be based on a variety of factors including magnitude of deviations between particular sets of pixel data or other factors that make distribution of residuals into categories more convenient. For example, an 8-bit pixel signal symbol value can produce LPD residual values ranging from −255 to +255, or 511 total possible residuals to be encoded if no further symbol reduction was performed. Nine categories can be used with an 8-bit example, which is shown in FIG. 3. The use of categories can be used to reduce the number and bit-size of the symbols to be encoded instead of using the large number of LPD residual symbol values for encoding.

Each category has a range of LPD residuals associated with it. "Position offset" refers to the position a given value occupies in the range associated with a given category. In a range of −15 to −5, −5 occupies position offset zero. The value −4 occupies position offset 1, the value −3 occupies position offset 2 and so on.

FIG. 3 illustrates an example use of category and associated offset value assignments for 8-bit pixel values where nine categories are defined (0 through 8). Each category i has $2i$ symbols. Thus, category 0 has just one symbol [0]. Category 1 has two symbols [−1, +1]. Category 2 has four symbols: [−3, −2, +2, +3], and so on. Each differential residual data symbol, e.g., (12, +2, −1, +5, +2) is classified based on its value and mapped into a two-tuple (category, range position offset) transmission set using a stored range table, such as the one shown in FIG. 3. The lowest value in each category is also referred to as offset 0. Each successively higher position offset value has a value that is one more than the position of a previous range element.

Figure 3A:
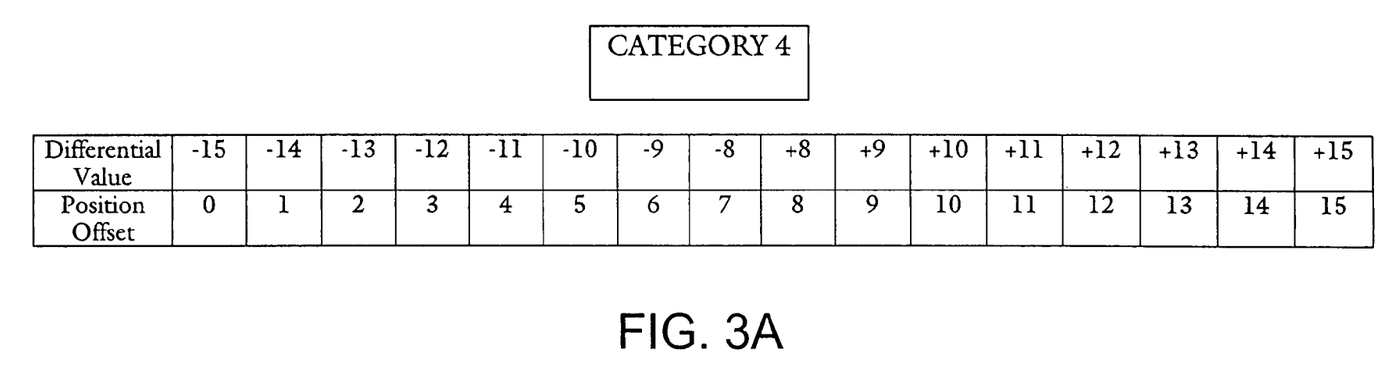
FIG. 3A shows a table showing an expanded representation of one of the FIG. 3 categories which defines a range of symbols and associated position offset values.

FIG. 3A shows a relationship between differential symbol values in a range with associated range position offsets for one of the categories in FIG. 3, i.e., category 4. Symbols in category 4 can assume values either in the range [−15, . . . , −8] or in the range [8, . . . , 15]. The lowest value in these ranges, −15 in this case, is coded as having a position offset of "0". Thus, the difference residual value "11" is coded as (4, 11), wherein "4" represents the category to which "11" belongs and "11" is the range position offset that identifies which position in the range is associated with category 4. Thus, given a matching encoding table (with ranges for each category), category and offset and the original differential residual can be obtained.

Referring to FIGS. 3 and 3A, for example, the residual value "12" would be converted to (4, 12), denoting category 4 and range position offset of "12" plus one (the zero position) places from the beginning of the range, i.e., "−15". In other words, range position is determined by counting from range position zero at the beginning of the range (e.g., FIG. 3, −15) until the range position indicated by the range position offset is reached (e.g., range position offset "12", which is a "+12" differential symbol value), as is shown by FIG. 3A.

In this exemplary embodiment, each category is defined so that they each contain a number of symbols which are a power of numerical value two. For example, category 0 has one symbol ($2^0$), category 1 has two symbols ($2^1$), category 2 has four symbols ($2^2$) and so on. Offset values can be calculated at the time when categories are assigned or at the time later compression techniques, such as variable length (VL) encoding is accomplished. However, it should be understood the invention is not limited to categories that have power-of-two numbers of symbols.

Residual classification using methods, such as variable length entropy encoding (also known as VL encoding), provides a technique which can be used to adaptively compress data values. Huffman encoding is one form of VL encoding.

VL encoding can be used to reduce the bit-size of the symbols to be encoded by determining the most frequently occurring symbols and assigning variable length codewords to symbols based on their intrinsic probability distribution. Most frequently occurring data stream symbols have the smallest bit sized symbols and least frequent data stream occurring symbols have the largest bit sized symbols. Thus, if VL entropy encoding were applied to the set of symbols in the range [−255, +255], then the symbol with the maximum likelihood of occurrence would be assigned a codeword of one bit, while the symbol with the minimum likelihood of occurrence would be assigned a maximum sized codeword of length 511 bits (e.g., the bit 1 written 511 times followed by a delimiter, such as zero). Category identifiers, e.g., category 1, category 2, etc., can be the symbols that are assigned VL codewords based on the frequency of residuals within each category (see FIG. 3). Accordingly, VL codewords which replace category identifiers which are more frequently used have smaller bit-sizes. Conversely, VL codewords replacing lesser used category identifiers have larger bit-sizes. However, it is necessary to analyze the frequency that category identifiers appear in a pixel data stream in order to effectively select which set of VL codewords would offer the best compression (bit-reduction) strategy.

VL encoding uses probability density function (PDF) data to base determination of the most efficient set of VL codewords. A PDF is computed for a given set of category identifiers determined from range classification of differential residuals. PDF data indicates frequency of occurrence of category identifiers. The PDF data is assembled into an ordered list of categories ranging from the category containing the most differential residuals to the category with the next most highest number of residuals and continuing to the category with the lowest non-zero number of residuals. Once PDF data for a selected row of pixel data has been determined, a VL encoding table with a corresponding PDF data pattern is selected from a group of such tables with different PDF data patterns. VL encoding in this example (e.g., VL encoding of category symbols (i.e., category identifiers)) is dependent on a pattern of residual frequencies per category, which changes rapidly from one image to the next or even across rows within an image. Accordingly, a VL encoding scheme for each pattern of residuals per category is needed to increase compression efficiency for various pixel row signal value distributions. Tables containing VL codewords associated with category identifiers are provided so that each table has a unique combination of VL codewords organized based on different PDF data sequences.

Figure 4:
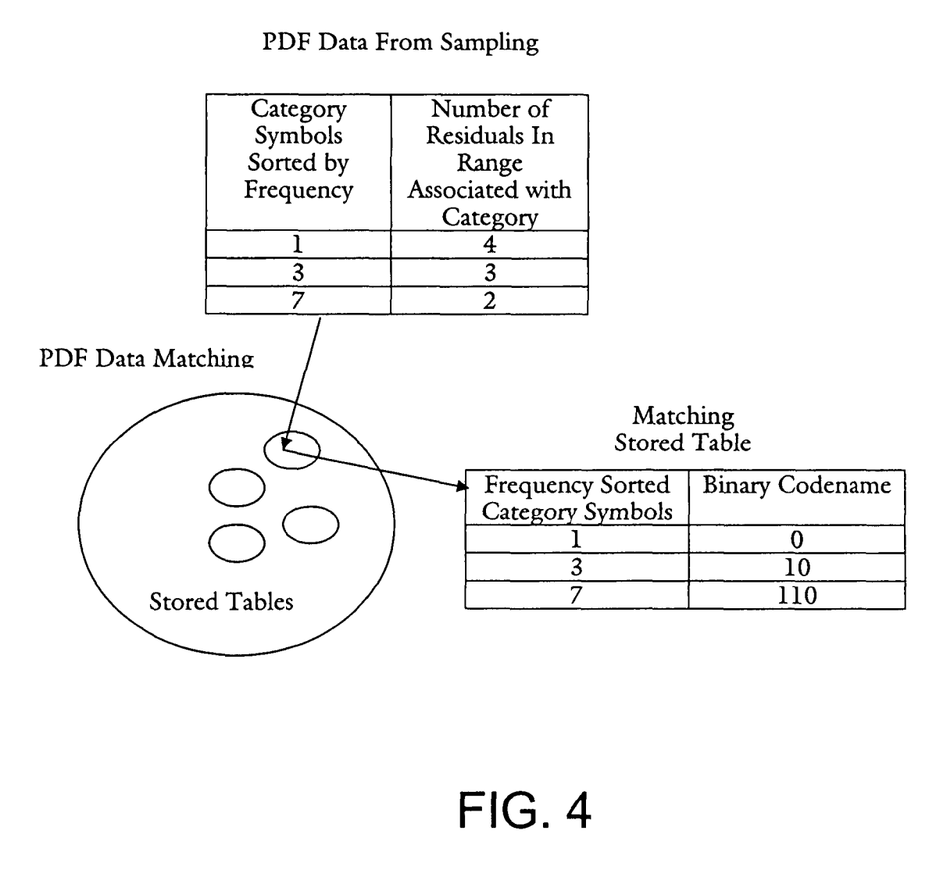
FIG. 4 shows relationships between stored tables, exemplary variable length binary encoding values, associated category identifiers and frequency of differential residual symbol values.

Each VL encoding table contains a different distribution of PDF match data by category. Referring to FIG. 4, for example, PDF match data for a selected pixel row channel can fall within category 1 (4 residuals), category 3 (3 residuals) and category 7 (2 residuals). One of the stored VL encoding tables with a matching PDF sequence of 1, 3 and 7 is selected and the stored VL codewords are used for encoding category symbols (i.e., category identifiers). The selected table will have optimally sized codewords such as, for example, a small sized one-bit vector "0" assigned to the most frequently occurring category, category 1 in the above example. On the other hand, a category 7, which is the least frequently occurring category, may be coded as binary value "10". If the number of category symbols were larger than in the FIG. 4 example, the least frequently occurring symbol could use the largest bit value possible for a particular coding scheme, such as the 8-bit vector "11111110". In such a way, the overall size of the symbols used to identify a collection of pixel data from a row to be encoded and transmitted from an imager array as binary values are reduced.

In this exemplary embodiment, codewords should be assigned to avoid aliasing of codewords to avoid codeword decoding problems. The use of aliasing in some situations gives rise to decoding problems when using variable length codewords. Aliasing is a situation where a string can be decoded as two different codewords, depending on how the string is interpreted. For example, assume one codeword is "1101" and another "110". During decoding, a string is encountered that is "110110". The question then arises of whether or not the first "1101" is codeword "1101" or a codeword followed by another codeword. Codeword ambiguity is avoided by using a clearly defined codeword delimiter wherein every codeword ends with zero ("0"). Accordingly, the smallest length codeword will be zero ("0"), the next smallest will be "10", the next smallest will be "110" and so on.

For images with low pixel variation, it is usually the case that the probability of the lower categories is always assigned the highest category bit value. As an example, it may be assumed that the probability of category 0 is the highest frequently occurring category. The probabilities of categories 6 to 8 in this example can be assumed to have the least frequently occurring residuals. In such a case, the codewords assigned to these categories may remain fixed irrespective of the row based PDF computations accomplished for each pixel row sampling operation. The relative PDF's of the remaining categories 1 through 5 may vary the most on a row-by-row basis. Consequently, the VL codewords assigned to these middle categories have to change based on differing PDF data patterns for the VL codewords to have an optimal bit-size.

There are 5! (=120) possible sequences of the five categories in the above example. The resulting VL encoding tables are stored for each of these 120 combinations, allowing a specific VL codeword to be selected based on a given row's specific PDF sequence, which can be calculated at the time of row processing in this exemplary embodiment.

The additional storage required for storing these tables in this example is 18×120 =2160 bytes. Category symbols, i.e., category identifiers, can have pre-assigned codewords stored in these tables for categories whose PDF's are known to be at the high-end or the low end of the probability range. Codewords can also be adaptively computed for those categories whose relative PDF's can change rapidly from one row to another. Limitations on the situations where adaptive computing of categories is used can also be employed to limit the amount of hardware dedicated to adaptive computation of code words as well reduce the amount of time spent in computing the PDFs used to perform VL encoding table selection.

Acquired images typically include three-channel images, with one channel each for colors, e.g., red, green, and blue, which are sampled from the sensor array 11. Each of these channels can have their own PDF distribution across rows. Each channel can be encoded accordingly using a precomputed VL encoding table which is selected based on a match between calculated PDF data for a sampled pixel row channel and PDF data associated with a stored VL encoding table. A unit receiving the transmitted VL encoded imaging data will calculate the PDF of the incoming imaging data and select one of a number of stored tables that match the PDF data for the incoming image data. It is also possible to transmit an encoding table identifier, which points the decoding system to the correct decoding table which is stored at the reception point.

Once the appropriate VL encoding table is selected, then sequential transmission of a two-tuple transmission dataset commences. The two-tuple transmission dataset includes a VL encoded category identifier and a range position offset. A category identifier associated with a pixel signal, such as the first pixel in a pixel row, is replaced with an associated VL codeword from the selected VL encoding table. Then, the VL codeword and the range position offset associated with the replaced category identifier is transmitted. Transmission of the two-tuple transmission data set in the present embodiment sequentially continues until all category identifiers and associated range position offset values from a pixel row are transmitted.

Figure 5:
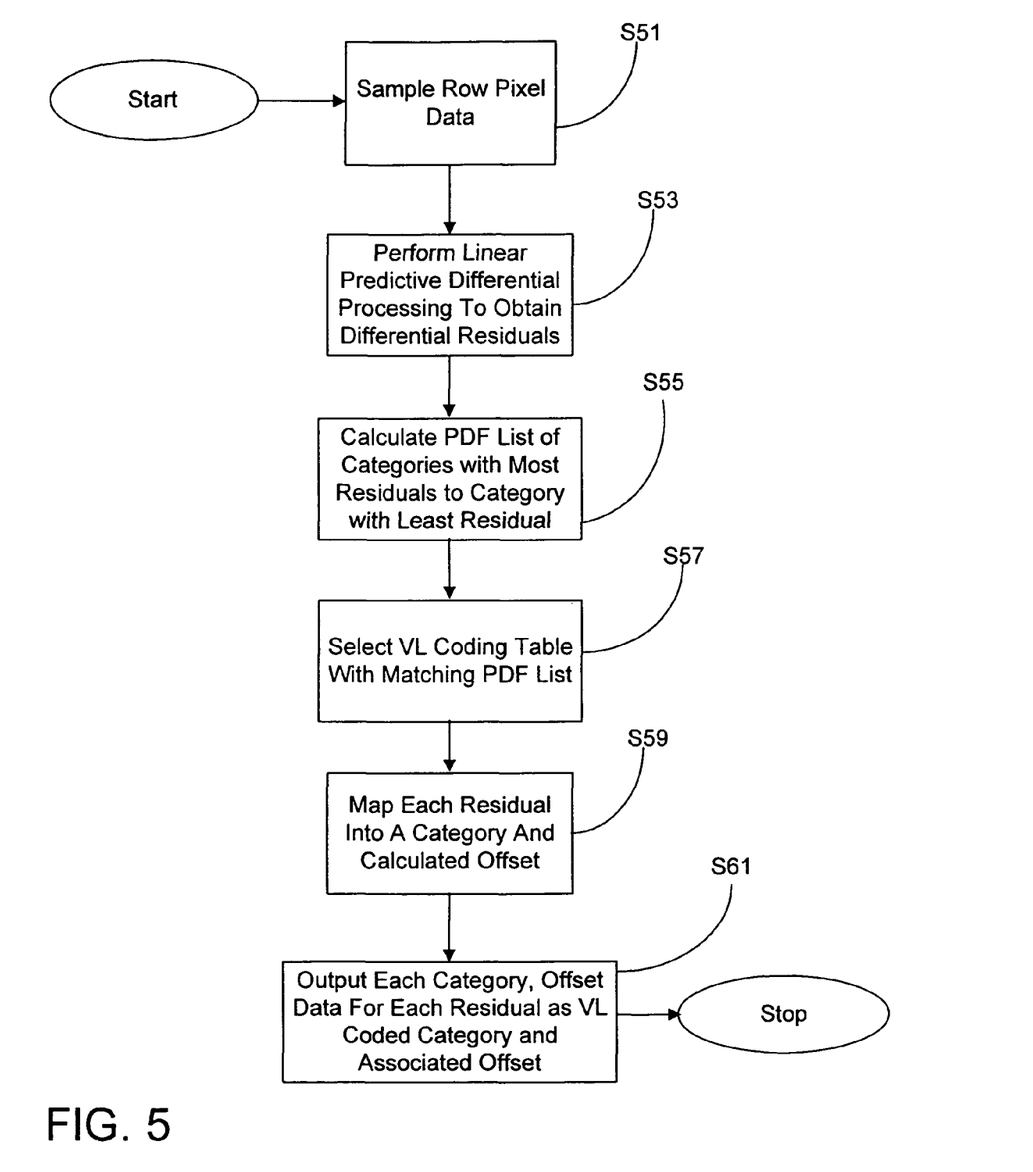
FIG. 5 shows a processing sequence in accordance with an exemplary embodiment of the invention.

Referring to FIG. 5, an exemplary adaptive compression sequence in accordance with the invention is shown. The FIG. 5 embodiment is discussed with reference to a simplified imager array. An eight pixel row is used herein for ease of illustration of the invention, however, the invention is not limited to eight pixels per row, but can be used with any number of pixels as well as groups of color pixels in rows of color pixel cells.

Figure 6:
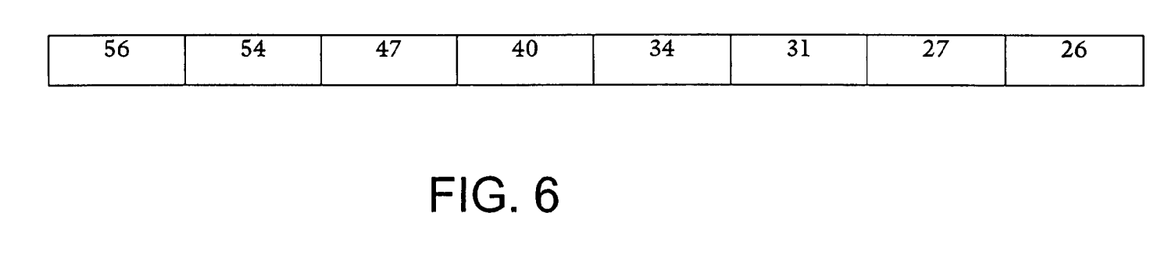
FIG. 6 shows a table of pixel values in an exemplary row of pixels.

FIG. 5 illustrates a compression sequence in accordance with the invention which commences with the sample and hold of one row of a pixel array containing, for example, eight pixels which is then converted into digital form (S51). Eight pixels is used merely as an example and illustrates the invention. In actual practice, there will be many more pixels in each row of a pixel array. In this exemplary embodiment, each color channel in a row is sampled at the same time and processed. In this example, as illustrated in FIG. 6, the following pixel values are sampled from a selected channel in the pixel row: 56, 54, 47, 40, 34, 31, 27, and 26.

Figure 7:
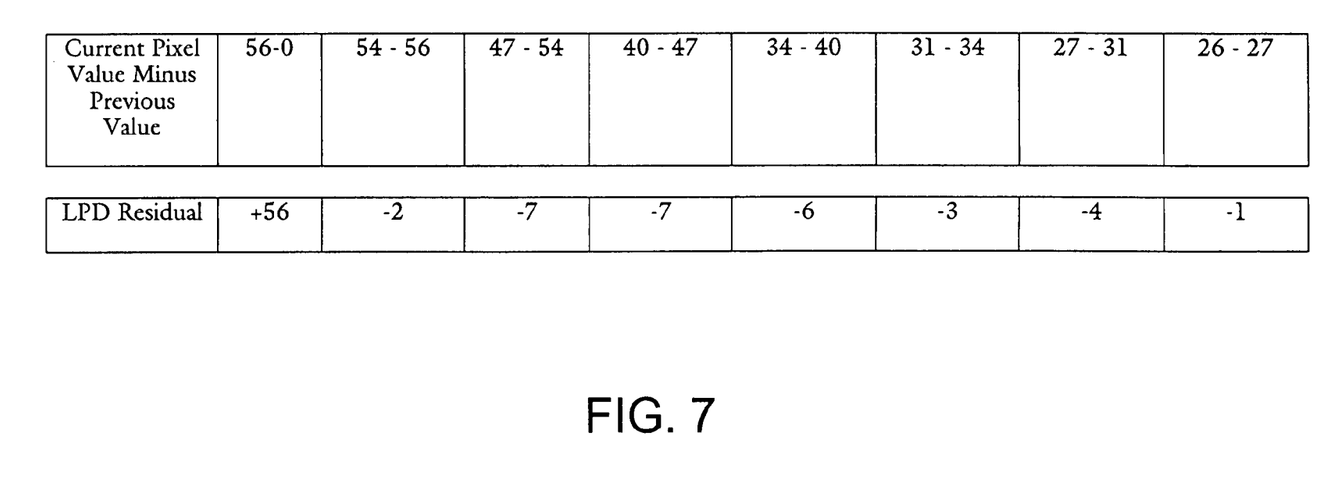
FIG. 7 shows an exemplary relationships between the FIG. 6 pixel row values and a differential calculation based upon a current pixel value and a preceding pixel value.

Next, at S53, LPD residuals are determined. The pixel values are processed starting with a beginning pixel value. For subsequent values, a differential is obtained by determining how much must be added to the previous value to obtain the current value. In other words, the current pixel value minus the previous pixel value obtains the residual associated with the current value. For example, the first residual is obtained by subtracting the preceding symbol (implied value "0") from the current symbol ("+56") (i.e., 56−0=+56). The second residual is obtained by subtracting the previous symbol 56 from 54 (54−56) to obtain a residual of "−2"). The third residual is 47−54 to obtain "−7", the fourth residual is 40−47="−7", the fifth residual is 34−40="−6", the sixth residual is 31−34="−3", the seventh residual is 27−31="−4" and the eighth residual is 26−27="−1". So, the resulting LPD residuals are +56, −2, −7, −7, −6, −3, −4 and −1, as illustrated in FIG. 7.

Figure 8:
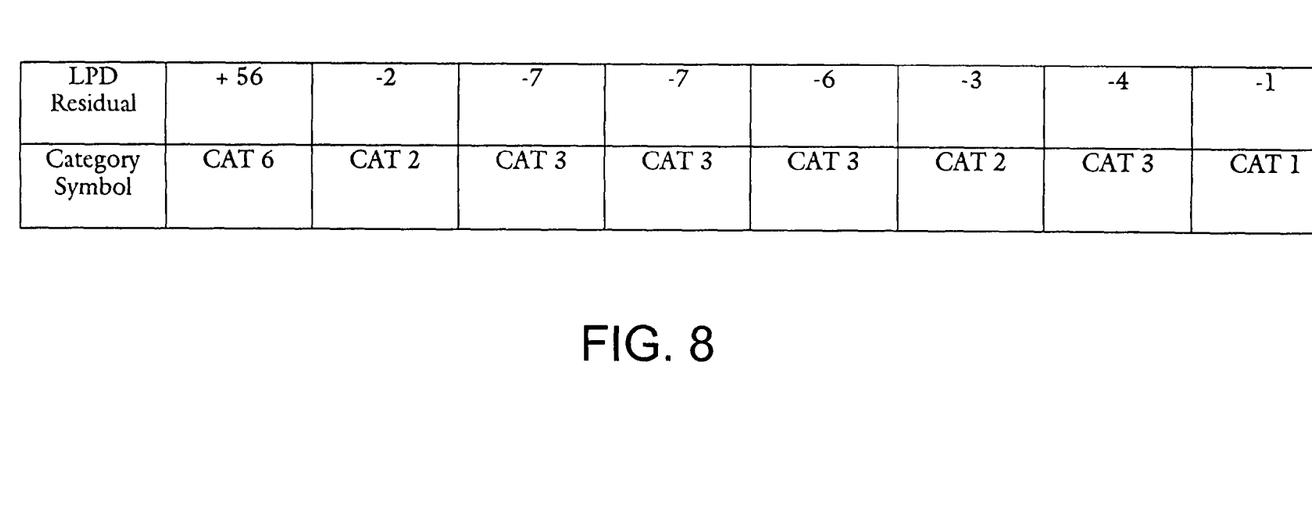
FIG. 8 shows a exemplary relationship between a linear predictive differential (LPD) residual value and a categorization value associated with the LPD residual value.
Figure 9:
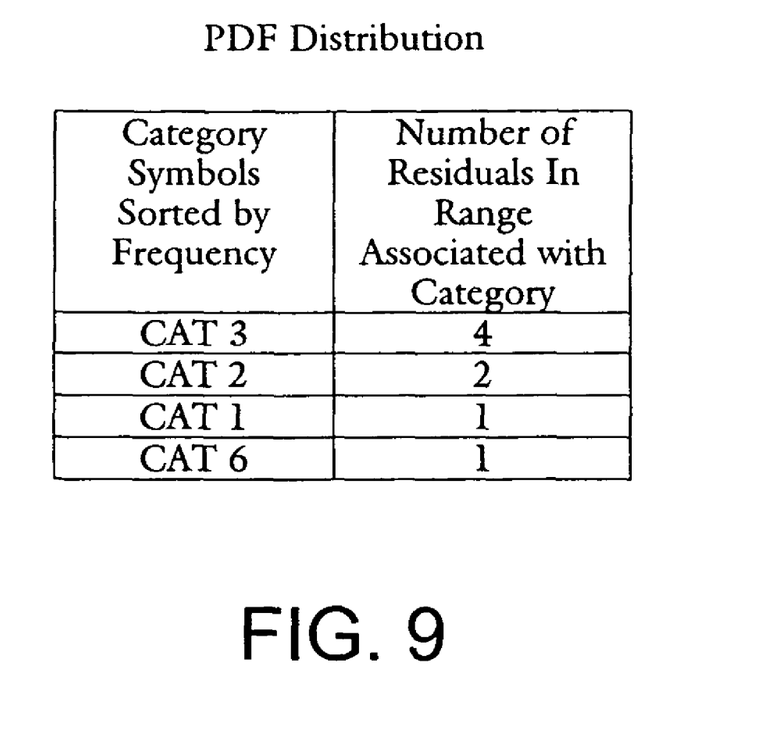
FIG. 9 shows an exemplary relationship between ordered category values and frequency of LPD residual values.

At S55 the PDF for the list of pixel data in LPD residual form is calculated. In this exemplary embodiment, the FIG. 3 set of categories and ranges are used to classify the residuals. As shown in FIG. 8, each differential residual is mapped into an associated category based on the FIG. 3 ranges and category associations. The first value, +56, falls into category 6. The second value, −2, falls into category 2. The third value, −7, falls into category 3. The fourth value, −7, falls into category 3. The fifth value, −6, falls into category 3. The sixth value, −3, falls into category 2. The seventh value, −4, falls into category 3. The eighth value, −1, falls into category 1. As shown in FIG. 9, the PDF distribution is category 3 with four residuals, category 2 with two residuals, category 1 with one residual and category 6 with one residual in descending order (i.e., CAT 3, CAT 2, CAT 1, CAT 6).

Figure 10:
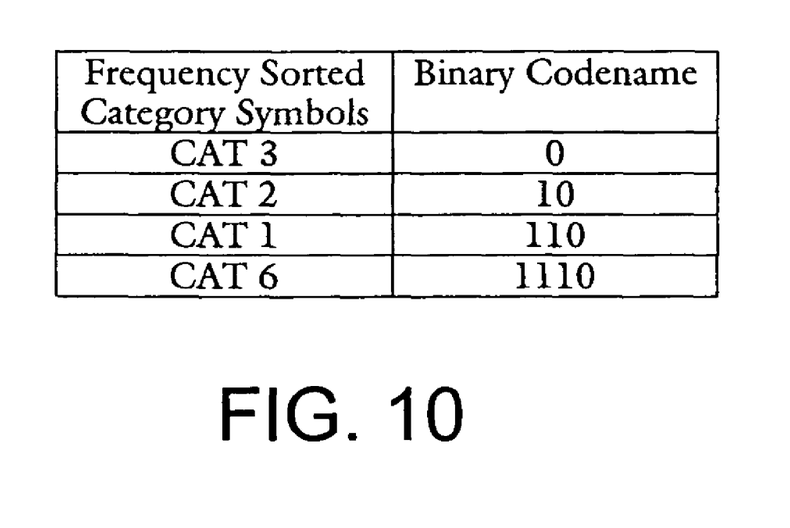
FIG. 10 shows an exemplary relationship between a set of frequency sorted category symbols and binary codenames.

At S57 the VL coding table with a matching PDF list is selected (e.g., an ordered table with CAT 3, CAT 2, CAT 1 and CAT 6). Each stored table will have codeword associations for each PDF list combination. Referring to FIG. 10 and using the present example, a selected table will have VL codeword "0" associated with the CAT 3 symbol (the most frequently occurring symbol), codeword "10" associated with CAT 2 (the second most frequently occurring symbol), codeword "110" associated with CAT 1 (the next most frequently occurring symbol) and codeword "1110" associated with the CAT 6 symbol (the least frequently occurring symbol). In the case of a tie between occurrences, some arbitrary selection method will be used, such as the first encountered, or the category number which is higher than the other, such as the integer label for category 6 (i.e., "6") is higher than category 1 label (i.e., "1").

Figure 11:
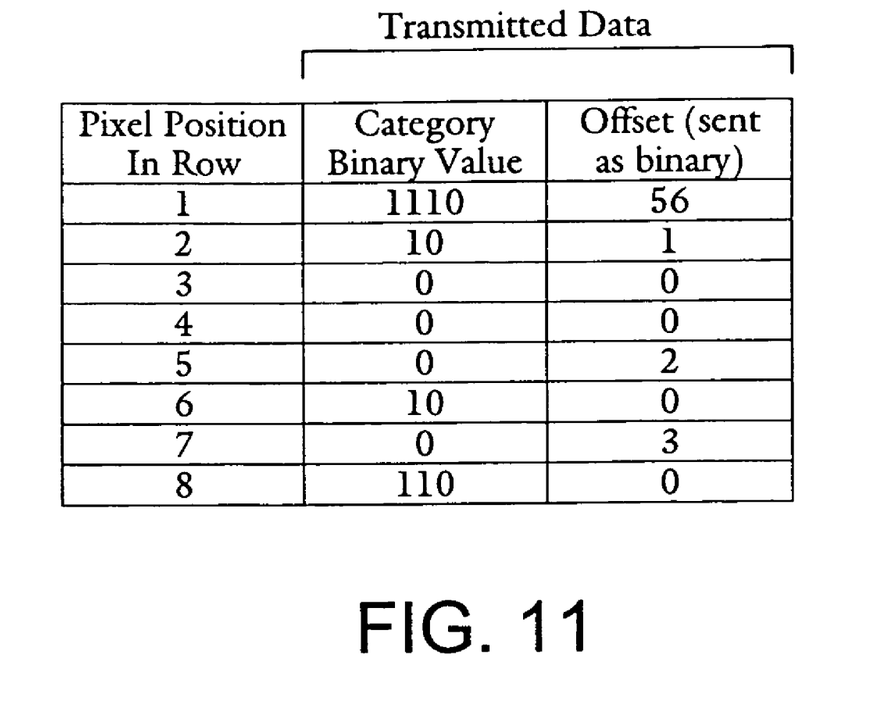
FIG. 11 shows an exemplary relationship between binary pixels in a row, category binary values and output data associated with the pixels.

At S59 the bitstream will begin to be assembled with codeword mapping and offset calculation. The processing will begin with the first pixel value in the row, e.g. value 56 then processing will work across the row. For example, 56 is a CAT 6 value, so the first output value will be VL codeword 1110. The first offset value is the smallest value, so that will be the difference between the offset range value of −63 and +56, which will be 56. Thus, the first output data of [VL codeword, range position offset] for pixel signal value 56, +56 differential and CAT 6 will be [1110, 56]. The second output data for pixel signal data of 54, −2 differential and CAT 2 will be coded as [10, 1]. The third output data for pixel signal data of 47, −7 differential and CAT 3 will be coded as [0,0]. The fourth output data for pixel signal data of 40, −7 differential and CAT 3 will be coded as [0,0]. The fifth output data for pixel signal data of 34, −6 differential and CAT 3 will be [0,1]. The sixth output data for pixel signal data of 31, −3 differential and CAT 2 will be [10,0]. The seventh output data for pixel signal data of 27, −4 differential and CAT 3 will be [0,3]. The eighth output data for pixel signal data of 26, differential −1 and CAT 1 is [110,0]. Thus, as illustrated in FIG. 11, the compression logic 15 (FIG. 2) will send [1110, 56], [10,1], [0,0], [0,0], [0,2], [10,0], [0,3], [110,0] to the serializer logic unit 16 for output to the transmission unit 19 at S61.

It should be noted that the invention can be used with any imager including CMOS, CCD or any other imager using an array of imaging structures. Color pixels in an array can be processed by color channel per row. A single processor can be used to sequentially process each channel of pixels corresponding to a row of color pixels. Multiple co-processors can also be used to simultaneously process all color pixel channels as well. For example, an embodiment can sequentially process each channel of blue pixels, then red, then green. Also, the invention can be provided as a stand alone compression system, provided on an imaging chip or integrated with other imaging system components, including a pixel image system signal processor.

While exemplary embodiments of the invention have been described and illustrated, it should be apparent that many changes and modifications can be made without departing from the spirit or scope of the invention. Accordingly, the invention is not limited by the description above, but is only limited by the scope of the appended claims.

What is claimed as new and desired to be protected by Letters Patent of the United States is:

1. An imager system comprising:
   an imaging array comprising a plurality of pixels;
   a processor circuit for outputting digital pixel signals representing incident light on the pixels of said array; and
   a compression circuit for compressing said digital pixel signals by encoding said pixel signals such that sequential pixel signals in each row are each encoded as first and second transmission data determined based upon a plurality of first and second data, wherein:
   said first data is based on differential pixel signals each determined from a corresponding one of a plurality of sets of sequential pixel signals;
   said second data is determined based upon at least one categorization of said first data values by predetermined ordered ranges, said second data comprising an ordered sequence of category identifiers by frequency of occurrence within said ranges;
   said first transmission data being assigned to said pixel signals from a selected codeword data set of a plurality of codeword data sets, said selected codeword data set being selected by matching said second data with one of said plurality of codeword data sets; and
   said second transmission data is determined for each pixel signal based upon a category identifier assigned to said pixel and a position within said range associated with said category identifier.

2. An imager system of claim 1 wherein said plurality of first data comprises linear prediction differential residual data values for each channel of said plurality of pixels in a row.

3. An imager system of claim 1, wherein said plurality of second data comprises an ordered list of category identifiers for linear prediction differential residual data value ranges corresponding to said first data values.

4. An imager system of claim 1 wherein said second transmission data is a range position offset based upon ordered ranges associated with a category identifier, said offset relates to a position from a beginning of the ordered range associated with an associated category identifier.

5. An imager system of claim 1, wherein said codeword data sets comprise more than one variable length codeword.

6. An imager system of claim 1, wherein said codeword data sets comprise Huffman codes.

7. An imager system of claim 1 wherein said codeword data sets comprise Huffman coding tables, wherein each coding table stores codewords associated with a category identifier, said codewords are ordered from a most frequently occurring category identifier having a smallest codeword bit-size value to a least frequently occurring category identifier having a largest bit-size codeword value.

8. An imager system comprising:
   an imaging array comprising a plurality of pixels;
   a pixel signal processor circuit for outputting digital pixel signals representing incident light on the pixels of said array; and
   a compression circuit for compressing said digital pixel signals by encoding said pixel signals such that sequential pixel signals in each row are each encoded with a codeword and a range position offset, said codewords determined based upon a plurality of first and second data, wherein:
   said first data is based on differential pixel signals each determined from a corresponding one of a plurality of sets of sequential pixel signals;
   said second data being determined based upon at least one categorization of said first data values by predetermined ordered ranges, said second data comprising an ordered sequence of category identifiers by frequency of occurrence associated within said ranges;
   said codewords being assigned to said pixel signals from a selected codeword data set of a plurality of codeword data sets, said selected codeword data set being selected by matching said second data with one of said plurality of codeword data sets, each set comprises one or more category identifiers ordered with a different sequence than identifiers in other of said sets and an associated codeword; and said range position offset for each pixel signal being determined based on a category identifier assigned to said pixel and the position within said range associated with said assigned category identifier.

9. An imager system of claim 8 wherein said plurality of first data comprises linear prediction differential residual data values for each channel of said plurality of pixels in a row.

10. An imager system of claim 8, wherein said plurality of second data comprises an ordered list of category identifiers for linear prediction differential residual data value ranges corresponding to said first data values.

11. An imager system of claim 8, wherein said range position offset is based upon ordered ranges associated with a category identifier, said offset being related to position from the beginning of the ordered range associated with an associated category identifier.

12. An imager system of claim 8, further comprising either a CMOS or CCD sensor.

13. An imager system of claim 8, wherein said plurality of second data is based upon probability density function data for said plurality of first data.

14. A method of performing image data compression comprising:

reading a plurality of pixel signals from a selected pixel row in an image sensor;

determining a plurality of first data based on differential pixel signals each determined from a corresponding one of a plurality of sets of sequential pixel signals;

determining a plurality of second data based upon at least one categorization of said first data, said second data comprising an ordered sequence of category identifiers by frequency of occurrence within an ordered range;

determining first transmission data for each pixel signal from a selected codeword data set of a plurality of codeword data sets, said selected codeword data set being selected by matching said second data with one of said plurality of codeword data sets;

determining a second transmission data for each pixel signal based upon a said category identifier assigned to said pixel and position within a range associated with said category identifier; and outputting encoded pixel signals such that each pixel signal in each row is encoded with said first and second transmission data.

15. A method as in claim 14, wherein said plurality of first data comprises linear prediction differential residual data values for each channel of said plurality of pixels in a row.

16. A method as in claim 14, wherein said plurality of second data comprises an ordered list of category identifiers for linear prediction differential residual data value ranges corresponding to said first data.

17. A method as in claim 14, wherein said second transmission data is a range position offset based upon ordered ranges associated with a category identifier.

18. A method as in claim 14, wherein said codeword data sets comprise more than one variable length codeword.

19. A method as in claim 14, wherein said codeword data sets comprise tables comprising Huffman codes.

20. A method as in claim 14, wherein said plurality of second data is based upon probability density function data for said plurality of first data.

* * * * *